(12) United States Patent
Yeh et al.

(10) Patent No.: US 9,110,528 B2
(45) Date of Patent: Aug. 18, 2015

(54) TOUCH-SENSITIVE DISPLAY APPARATUS

(71) Applicant: J TOUCH CORPORATION, Taoyuan County (TW)

(72) Inventors: Yu-Chou Yeh, Taoyuan County (TW); Hsiao-Shun Jan, Taoyuan County (TW)

(73) Assignee: J TOUCH CORPORATION, Taoyuan County (TW)

( * ) Notice: Subject to any disclaimer, the term of this patent is extended or adjusted under 35 U.S.C. 154(b) by 228 days.

(21) Appl. No.: 13/757,807

(22) Filed: Feb. 3, 2013

(65) Prior Publication Data

US 2014/0218308 A1 Aug. 7, 2014

(51) Int. Cl.
 *G06F 3/041* (2006.01)
(52) U.S. Cl.
 CPC ...................................... *G06F 3/041* (2013.01)
(58) Field of Classification Search
 None
 See application file for complete search history.

(56) References Cited

U.S. PATENT DOCUMENTS

| | | | | |
|---|---|---|---|---|
| 2007/0063983 | A1* | 3/2007 | Huang et al. | 345/173 |
| 2011/0291966 | A1* | 12/2011 | Takao et al. | 345/173 |
| 2011/0310037 | A1* | 12/2011 | Moran et al. | 345/173 |
| 2012/0081324 | A1* | 4/2012 | Philipp | 345/173 |
| 2012/0193130 | A1* | 8/2012 | Fix et al. | 174/255 |
| 2013/0294037 | A1* | 11/2013 | Kuriki et al. | 361/748 |

FOREIGN PATENT DOCUMENTS

| | | |
|---|---|---|
| JP | 5036913 B1 | 2/2012 |
| KR | 10-2006-0109548 | 3/2008 |

* cited by examiner

*Primary Examiner* — Grant Sitta
*Assistant Examiner* — Kirk Hermann
(74) *Attorney, Agent, or Firm* — Li&Cai Intellectual Property (USA) Office

(57) ABSTRACT

Disclosure herein is related to a touch-sensitive display apparatus that is constituted of a display panel and a touch-sensitive panel. A plurality of pixels are employed to render a frame generated by the display panel. The single pixel is composed of a red subpixel, a green subpixel, and a blue subpixel. In one embodiment of the present invention, the touch-sensitive panel adopts the transparent substrate, on which a plurality of electrode lines are formed. In particular, the each electrode line is approximately paved along a diagonal line of at least one pixel.

7 Claims, 6 Drawing Sheets

TOUCH-SENSITIVE DISPLAY APPARATUS

BACKGROUND

1. Technical Field

The present invention is related to a touch-sensitive display apparatus, in particular to the display apparatus having a transparent substrate on which a plurality of electrode lines are formed to cover the subpixels of every pixel.

2. Description of Related Art

The general touch-sensitive module applied to a touch-sensitive display is such as a circuit substrate used to sense the touch event on the display. This circuit substrate is usually a transparent substrate. Upon the transparent substrate, a plurality of electrodes made of conductive materials are formed as the circuit for sensing the touch event in the touch-sensitive display. One of the types of the electrodes is such as the lines made of conductive material, for example the metal. The electrode line has a certain width. The two lines define an intersection that causes the X-direction and Y-direction signals when any touch event thereon is detected. The signals will drive an application program to act reflecting the operation made by the touching behavior.

The relevant technology may be referred to the schematic diagram of the conventional touch-sensitive display apparatus in FIG. 1.

The touch-sensitive display apparatus shown in the diagram essentially includes a touch-sensitive substrate 103 and electrode lines formed upon the top and bottom surfaces thereof. The shown lines are such as the row electrode lines 101 and the column electrode lines 102. A panel 10 is therefore formed as fabricating the substrate 103 and the electrodes. This panel 10 is then combined with a top lid 105 by an adhesive 104, and with the display panel 107 using an adhesive 106.

The materials to make the touch-sensitive substrate 103 are such as glass, plastics, or a blend of glass and plastics. The row electrode line 101 and column electrode line 102 are respectively formed along x-direction and y-direction. The capacitance effect is induced to form an electric field while a user's fingers touch the touch-sensitive panel. The interlaced electrode lines 101, 102 allow precisely determining the position to be touched.

The types of the conventional electrodes may be referred to FIG. 2A which shows a capacitance-type touch-sensitive panel. The diagram exemplarily shows an electrode layout of the touch-sensitive panel. The layout has row electrode lines 203 and column electrode lines 204. Each cross point made by the interlaced electrode lines 203, 204 is preferably positioned onto each pixel 20 on the display. The cross points allow determining the pixels associated with the positions to be touched. Parasitic capacitor 201 exists onto the pixel 20 where the row electrode line 203 and the column electrode line 204 are intersected.

The parasitic capacitor 201 is induced to be a signal capacitor 202 when current flows across the parasitic capacitor 201 and changes the electric field between the electrode lines 203, 204. On the other words, the touching event changes the electric field across the capacitor of the panel; that means the finger, palm or other parts of the human body inducing the change of the signal capacitor 202. The signal capacitor 202 associated with the row electrode line 203 and the column electrode line 204 is used to sense the position to be touched.

Reference is made to FIG. 2B schematically showing a relationship of the electrode lines and the pixels in the conventional technology. A series of pixels are presented on a display panel orderly. The each pixel is composed of subpixels with different colors. In an example, the subpixels are such as red subpixel (R), green subpixel (G), and blue subpixel (B). The row electrode lines 203' and column electrode lines 204' are interlaced above the pixels. It is noted that the each cross point of row electrode lines 203' and the column electrode line 204' is approximately covered over the center of the each pixel.

FIG. 2C again shows the diagram of the relationship of one pixel and the crossed electrode lines. One enlarged pixel 20 including a red subpixel, green subpixel and blue subpixel is shown in the diagram. This example shows a cross point of the row electrode line 203" and the column electrode line 204" on the touch-sensitive panel is positioned onto center of the green subpixel.

According to the descriptions related to the FIG. 2B or FIG. 2C, in the conventional technology the electrode lines of the touch-sensitive panel are usually designed to be formed along longitudinal and horizontal directions. The cross points therein can be located at the center of each pixel as far as possible. In FIG. 2C, the cross point locates at the central subpixel of the pixel. Accordingly, since the electrode line has a certain width, the subpixel(s) may be partly shielded. The effect of shield may result in obscuring the brightness of the subpixel(s). Furthermore, the colors illuminated may not be uniform since the every subpixel meets different shielding conditions. At last, the displayed frame may have color shift caused by the uneven colors illuminated from the subpixels.

For example, the conventional touch-sensitive panel includes longitudinal and horizontal sensing electrodes thereon, and the electrodes may merely cover one of the subpixels in each pixel. Thus the colors of the each pixel may not be uniform and make bad display quality.

A tolerance of fabricating the display may exist and result in poor accuracy as combining the touch-sensitive panel with the display panel. In addition to the above-described color shift made by the uneven shielding effect for each pixel, the tolerance may cause the uneven brightness because of the inconsistent matching between the sensing electrodes and the pixels. The mentioned at least two shortcomings may together generate much greater color shift.

SUMMARY

According to one of embodiments of the present invention, a touch-sensitive display apparatus is featured to diagonally dispose electrode lines onto a touch-sensitive panel. One of the objectives of the invention is to allow the electrode lines to evenly shield the every subpixel in each pixel. Therefore color shift of the display apparatus can be avoided since the subpixels in one pixel have similar shielded area.

According to the embodiment, the touch-sensitive display apparatus includes a display panel having multiple pixels to render a frame. The every pixel is composed of a plurality of subpixels having different colors. The subpixels are such as red subpixel, green subpixel and blue subpixel. Some other colors such as white, black and other levels of colors may not be excluded in some other embodiments.

The touch-sensitive display apparatus also includes a touch-sensitive panel which at least includes a transparent substrate. The transparent substrate has a plurality of electrode lines. In particular, the every electrode line is disposed approximately along a diagonal line of at least one pixel.

According to one further embodiment, the display apparatus includes one more transparent substrate, on which a plurality of electrode lines are disposed along the different direction rather than the previous layout of electrode lines on the other substrate.

In one next embodiment, the more electrode lines are disposed among the electrode lines on the transparent substrate, and the horizontal distance of the adjacent electrode lines is around the width of one subpixel.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Figure 1:
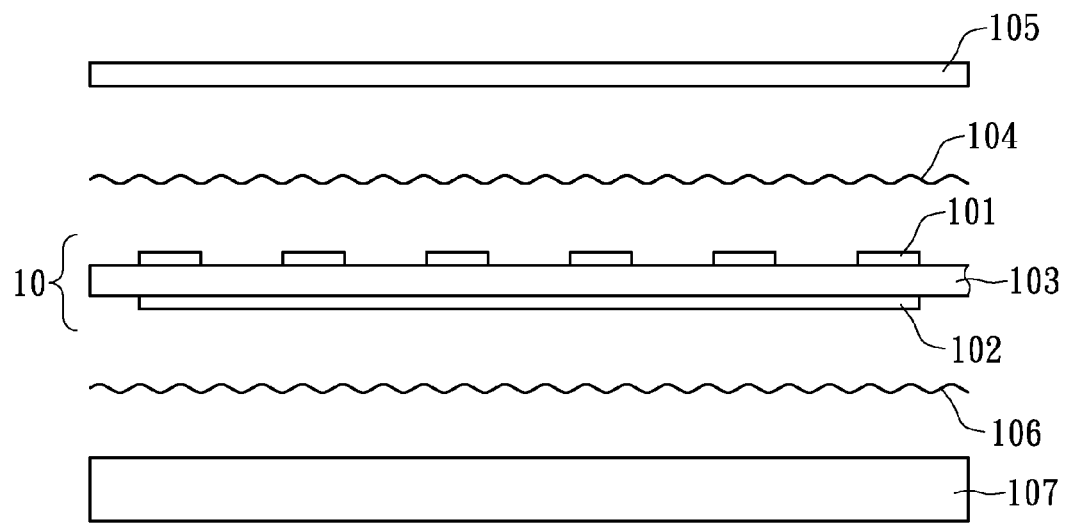
FIG. 1 shows a schematic diagram of structure of a conventional touch-sensitive display apparatus.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2A:
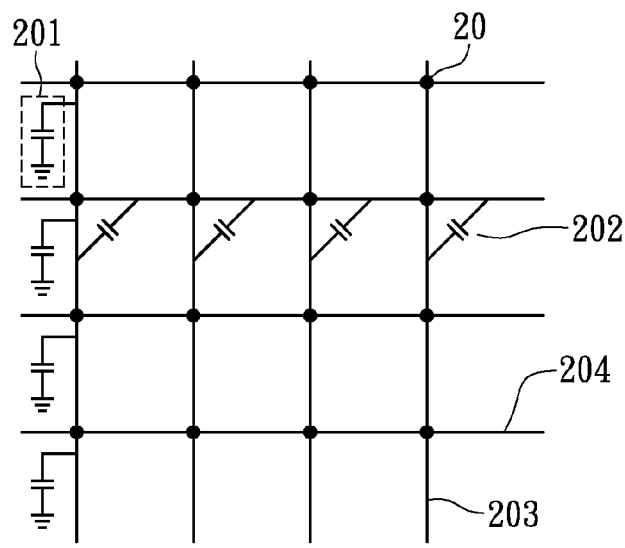
FIG. 2A shows a schematic diagram of a conventional capacitance-type touch-sensitive panel.
Figure 2B:
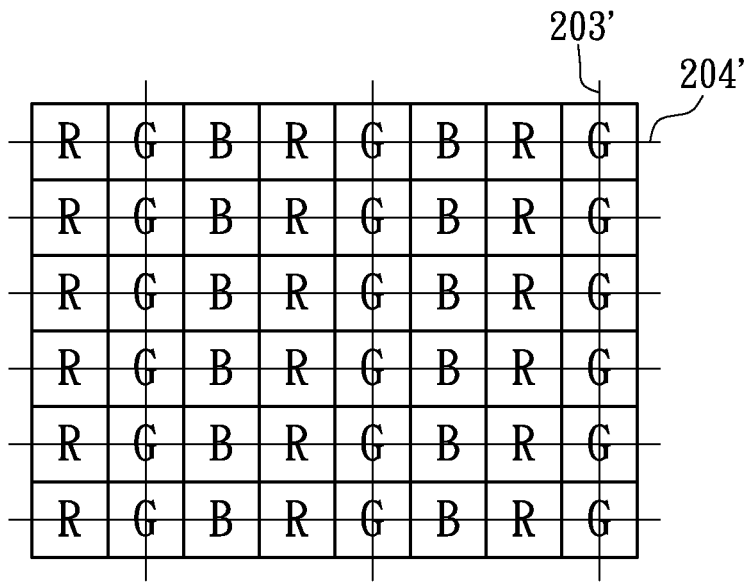
FIG. 2B shows relationship of the electrode lines and pixels of the conventional technology.
Figure 2C:
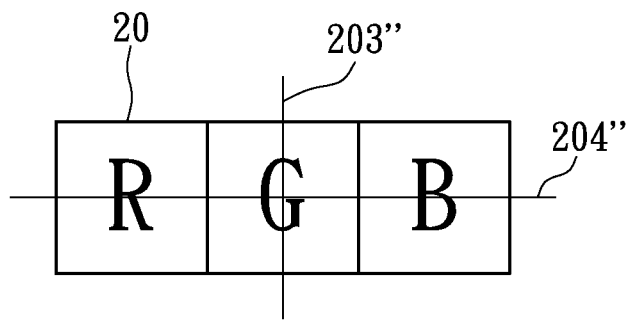
FIG. 2C shows a schematic diagram of the pixels and electrode lines according to the conventional technology.

The layout of electrode lines paved onto a touch-sensitive panel of the conventional technology often adopts vertical and horizontal lines to form the electrode array. The layout may also be configured due to a specific need. Based on this design, the intersectional points formed by the crossing of the electrode lines are approximately located at the center of the every pixel. According to the conventional technology, such as FIG. 2C, the shown intersectional point is located at the center of the pixels having three subpixels. The intersectional point is preferably located at the middle subpixel rather than the two other subpixels. Therefore, the electrode line with a specific width may cause effect of shielding over the related pixels. In one example, the line may only shield one of the subpixels, and therefore part of the brightness may be shielded. The provided touch-sensitive display apparatus using an innovative layout of electrode lines is one of the solutions to reduce the possibility of uneven brightness.

Figure 3A:
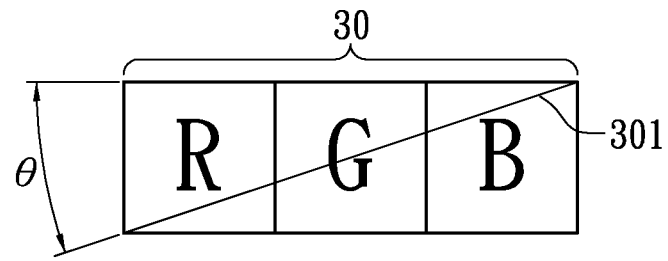
FIG. 3A shows a schematic diagram illustrating one embodiment of the electrodes of the present invention.

One of the embodiments of the present invention is referred to FIG. 3A showing a schematic diagram of the electrodes. According to the technical features of the present invention, a pixel 30 which is composed of some colored subpixels is described. The subpixels are such as a combination of a red subpixel (R), a green subpixel (G), and a blue subpixel (B). It is noted that the practical embodiment is not limited to the colored subpixels described above. Some other colors such as black, white, or other color levels may also be included. The pixel may be designed as the combination of subpixels such as RGBW, wherein "W" represents white color. The each of red subpixel, green subpixel and blue subpixel can be generated by a backlit module of a display panel through a color filter.

According to the current example, the shown red subpixel (R), green subpixel (G), and blue subpixel (B) are orderly arranged to form one pixel 30. The present invention also shows the electrode line 301 disposed onto a touch-sensitive panel is a single-axial electrode and along a diagonal line of the pixel 30. The diagram shows an angle θ exists between the direction of electrode line 301 and a horizontal direction.

According to one of the preferred embodiments, the included angle θ of the diagonal line over the pixel 30 may be in between 18.435 degree and 71.565 degree when it is supposed that the three subpixels occupy the same or similar areas. Further, in one exemplary embodiment, the electrode line 301 may be the metal wire having the width 1 μm through 10 μm. For avoiding too much difference between the areas of the different subpixels shielded by the electrode line 301, the electrode line 301 is designed to occupy the similar area ratio of each of the subpixels R, G, B. Therefore, the frame generated by the related display panel may not meet too much problem because of color shift phenomenon.

Figure 3B:
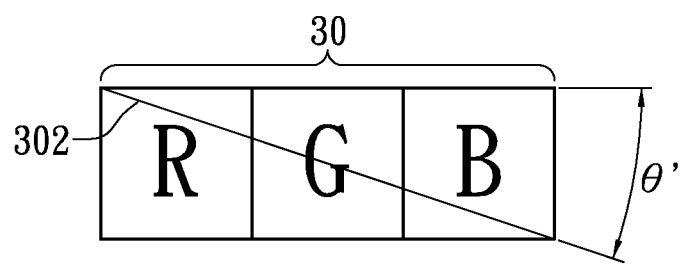
FIG. 3B shows a schematic diagram of one further embodiment of the electrodes of the present invention.

Reference is also made to FIG. 3B that shows one further embodiment of the electrode disposed along the other direction. On the pixel 30, a single-axial electrode line 32 is disposed. The direction of electrode line 302 forms an angle θ' with respect to the horizontal direction.

Similarly, the electrode lines are disposed along the diagonal line over the pixel 30 according to one of the embodiments of the present invention. The electrode line 302 onto the touch-sensitive panel may shield the similar area over every subpixel R, G, B. Therefore, the layout successfully reduces the color-shift phenomenon from the displayed image because the shielded areas over the subpixels have similar ratios.

Figure 4:
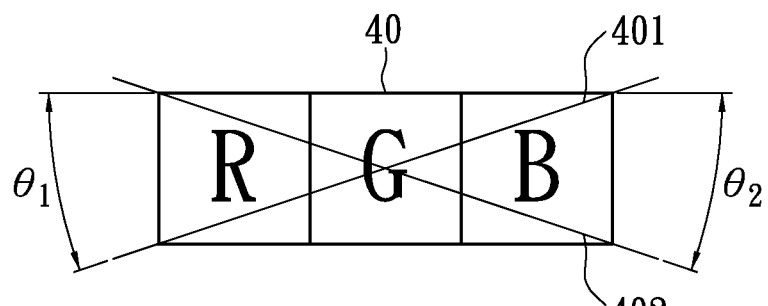
FIG. 4 is a schematic diagram showing the electrode in one embodiment of the present invention.

FIG. 4 shows a schematic diagram of the electrodes applied to the touch-sensitive display apparatus in accordance with the present invention. A pair of biaxial electrode lines 401, 402 are respectively disposed over two interlaced directions. The two electrode lines 401, 402 respectively form the angles $\theta_1$ and $\theta_2$ with respect to the direction (horizontal) of the pixel 40. It is noted that the angles $\theta_1$ and $\theta_2$ may be identical, similar, or different.

According to the major technology adopted by the present invention, the directions of the two electrode lines 401, 402 may be disposed approximately along the diagonal line over the shielded pixel 40. One of the objectives of the invention is to serve the similar shielding areas over the subpixels of the pixel 40.

Figure 5:
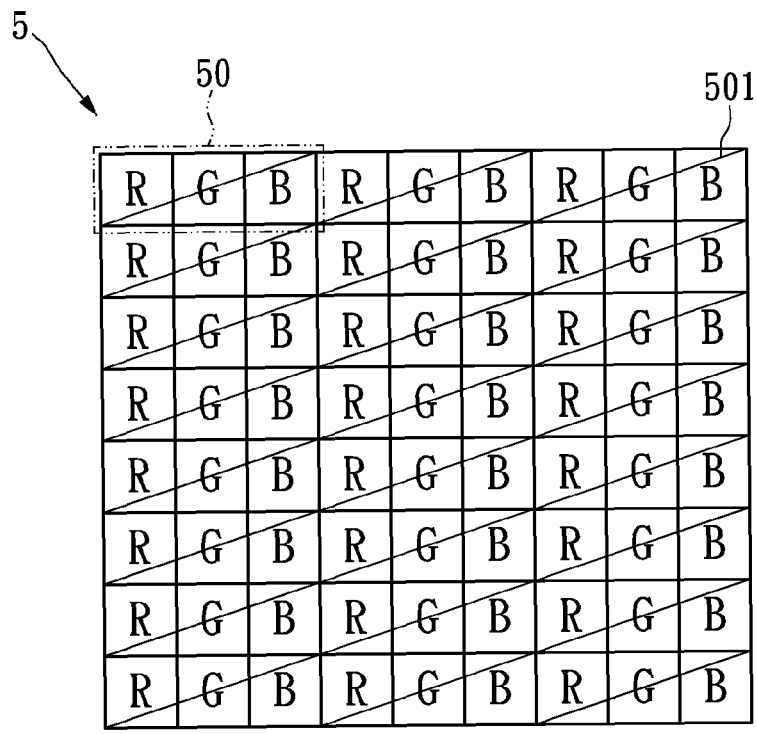
FIG. 5 shows a schematic diagram illustrating one embodiment of combination of the electrodes and a display panel in accordance with the present invention.

FIG. 5 next shows a schematic diagram illustrating fabrication of the electrode lines and a display panel in one embodiment of the present invention.

A display panel 5 is described. A plurality of pixels 50 are formed onto the display panel 5. The single pixel is composed of a plurality of colored subpixels. The subpixel is such as the shown red subpixel (R), green subpixel (G), and blue subpixel (B). Also, the subpixel may be implemented by the subpixel with other various colors. Furthermore, the backlit source may be the various types disposed in the display panel 5. The backlit type is such as Cold Cathode Fluorescent Lamp (CCFL) or light-emitting diode (LED). When the white light is emitted by the backlit source, the emitted light may produce various colors of light through a color filter. Therefore, the colored subpixels are orderly generated in each pixel.

In the current example, a plurality of electrode lines 501 are disposed onto a transparent substrate (not shown) of the display panel 5. The each electrode line 501 is formed approximately along the diagonal line of every single pixel 50.

Figure 6:
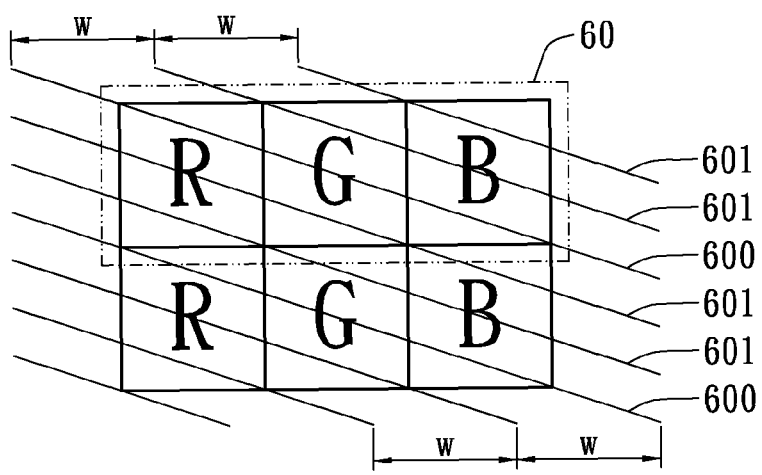
FIG. 6 shows one further embodiment of the electrodes according to one embodiment in accordance with the present invention.

FIG. 6 shows a diagram illustrating the electrode layout in one further embodiment of the present invention.

A pixel 60 is exemplarily shown. Besides the electrode lines 600 approximately along the diagonal line of the single pixel 60, one or more electrode lines 601 are further disposed in between the electrode lines 600. The adjacent electrode lines 600, 601 formed on the transparent substrate are distanced with a width W which is approximately the width of one subpixel along a horizontal direction.

Reference is made to FIG. 6. It is shown that the electrode lines occupy the similar ratios of area over the subpixels of a pixel. The plurality of electrode lines 600, 601 obviously shield the approximate number of subpixels and occupy similar areas over the subpixels. It is therefore that uneven shielding effective resulting in color shift may be solved.

Figure 7:
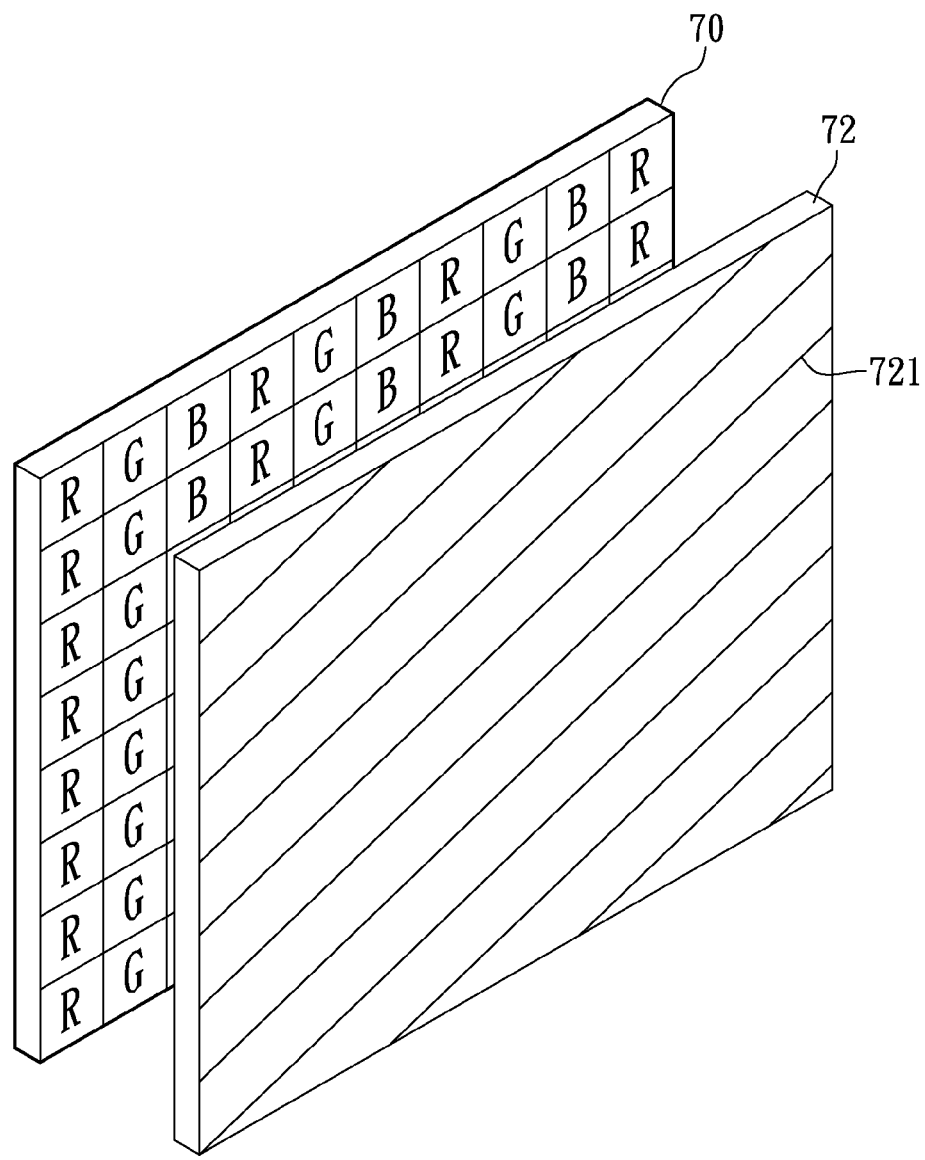
FIG. 7 shows a perspective view of the claimed touch-sensitive display apparatus according to one of the embodiments of the present invention.

The touch-sensitive display apparatus using the layout of electrode lines is exemplarily referred to FIG. 7.

The shown display panel 70 is such as a liquid-crystal display panel (LCD), a plasma display panel (PDP), or an organic light-emitting diode (OLED). Pixels composed of various colored subpixels are formed. The subpixels are, but not limited to the current example, such as the red subpixels (R), the green subpixels (G), and the blue subpixels (B).

The touch-sensitive panel formed on top side or bottom side of the display panel 70 may include a transparent substrate 72. The material making the transparent substrate 72 is such as glass, plastics, and their mixture, for example PET, PMMA. The electrodes onto the transparent substrate 72 is such as the electrode lines 721 which may be formed under the process including etching, printing, or/and depositing, or the other process of forming the metal wires on the substrate.

The electrode lines 721, according to one exemplary embodiment, are disposed on the transparent substrate 72 along a direction having a slope with a specific angle. In addition to the flexible controlling or driving circuits onto the transparent substrate 72, the electrodes such as the electrode lines 721 in the embodiment are disposed. The electrode lines 721 are disposed preferably along the diagonal line of at least one pixel of the display panel 70. The general materials making the touch-sensitive electrode line 721 are the transparent conductive materials such as ITO (indium tin oxide). Some other non-transparent conductive materials such as copper, aluminum, gold, and silver are applicable to the present invention.

Figure 8:
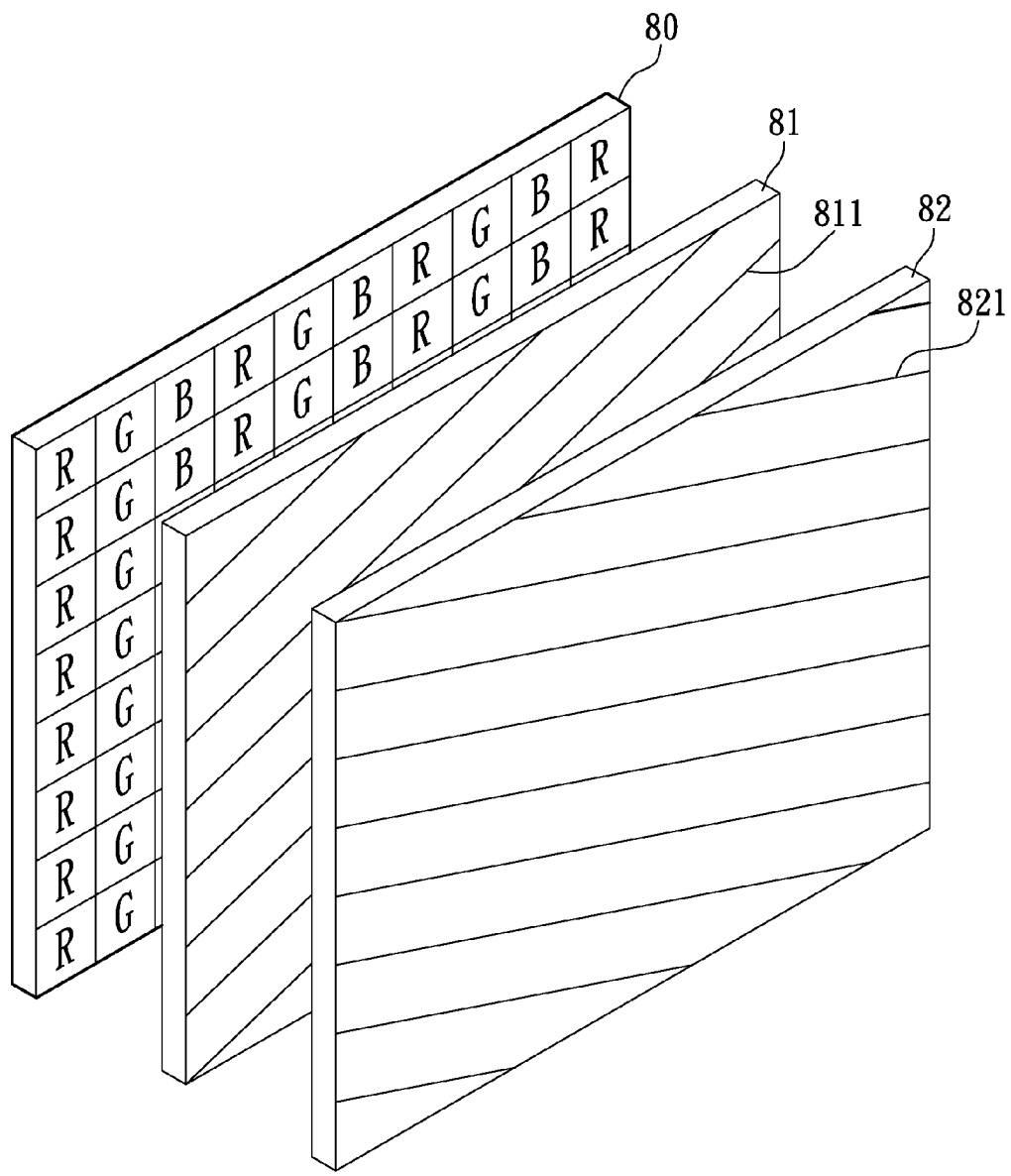
FIG. 8 shows another perspective view of the claimed touch-sensitive display apparatus according to another one embodiment of the present invention.

The touch-sensitive display apparatus shown in FIG. 8 describes one further embodiment of the present invention.

A display panel 80 is laminated with the touch-sensitive panel. The touch-sensitive panel exemplarily includes two transparent substrates respectively being a first transparent substrate 81 and a second transparent substrate 82. The transparent substrates are respectively disposed with electrode lines 811 and 821.

Further, the first transparent substrate 81 is disposed with a plurality of electrode lines 811 having a slope of a specific angle. In particular, the slope is configured in response to the layout of pixels of the display panel 80. It is preferred that the electrode lines 811 are disposed approximately along the diagonal line of at least one pixel.

The touch-sensitive panel further includes a second transparent substrate 82 on which the plurality of electrode lines 821 are disposed opposite to the first transparent substrate 81. It is noted that the direction of the electrode lines 821 is different from the electrode lines 811.

According to one further embodiment (not shown in this diagram), rather than the above-described structure having two separate first transparent substrate 81 and second transparent substrate 82, both sets of the electrode lines 811 and 821 may be respectively disposed onto the surfaces of two sides of the transparent substrate. Also, the direction of the electrode lines 821 is different from the direction of the electrode lines 811. It is noted that the electrodes lines 811, 821 at one or both sides of the transparent substrate are disposed along the diagonal direction of at least one pixel.

In one exemplary embodiment of the process of manufacturing the electrode lines, the width of the biaxial sensing electrode lines may be in range of 1 μm through 10 μm. The biaxial sensing electrode lines are respectively disposed on two sides of the transparent substrate. Alternatively, the two sets of biaxial sensing electrode lines are respectively disposed onto two separate transparent substrates. It is noted that an included angle $\theta_1$ between the direction of electrode lines and the horizontal direction is around 18.435 degree through 71.565 degree. Further, the included angle $\theta_2$ is around 18.435 degree through 71.565 degree. The angles are denoted as the references shown in FIGS. 3A, 3B and 4.

In summation, the touch-sensitive display apparatus in accordance with the present invention is featured that the direction of electrode line is disposed approximately along the diagonal direction of the each pixel. Therefore, the disposal of the electrode lines according to the present invention serves the similar shielding areas to the subpixels R, G, B and effectively reduces the phenomenon of color shift.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A touch-sensitive display apparatus, comprising:
   a display panel, in which a plurality of pixels representing a frame, and each pixel is composed of a plurality of subpixels with different colors; and
   a touch-sensitive panel, combined with the display panel, at least including a transparent substrate, on which a plurality of non-transparent electrode lines are formed, and each electrode line is disposed along a diagonal line of at least one pixel, by which allowing the electrode lines to evenly shield the every subpixel in each pixel so as to render uniform illuminated colors.

2. The apparatus of claim 1, wherein the subpixels of single pixel at least include a red subpixel, a green subpixel and a blue subpixel.

3. The apparatus of claim 1, wherein there is an included angle θ between the electrode line and a horizontal direction of the pixel, and θ is 18.435 degree to 71.565 degree.

4. The apparatus of claim 1, wherein on the transparent substrate one or more further electrode lines are formed between the electrode lines disposed along a diagonal line of at least one pixel, and a horizontal distance between the adjacent two electrode lines is a width of one subpixel.

5. The apparatus of claim 1, wherein the electrode line is a non-transparent metal line.

6. The apparatus of claim 5, wherein the width of the metal line is 1 μm through 10 μm.

7. The apparatus of claim 1, wherein the display panel is a liquid-crystal display panel, a plasma display panel, or an OLED display panel.

* * * * *